(12) United States Patent
Cui et al.

(10) Patent No.: US 11,559,847 B2
(45) Date of Patent: Jan. 24, 2023

(54) SUPERALLOY PART AND METHOD OF PROCESSING

(71) Applicant: General Electric Company, Schenectady, NY (US)

(72) Inventors: Yan Cui, Greer, SC (US); Michael Douglas Arnett, Simpsonville, SC (US); Matthew Joseph Laylock, Easley, SC (US); Brian Lee Tollison, Honea Path, SC (US); Jeffrey Michael Breznak, Waterford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/737,469

(22) Filed: Jan. 8, 2020

(65) Prior Publication Data
US 2021/0205910 A1    Jul. 8, 2021

(51) Int. Cl.
*B23K 1/00* (2006.01)
*C22F 1/10* (2006.01)
(Continued)

(52) U.S. Cl.
CPC .......... *B23K 1/0018* (2013.01); *C22C 19/056* (2013.01); *C22C 19/057* (2013.01);
(Continued)

(58) Field of Classification Search
None
See application file for complete search history.

(56) References Cited

U.S. PATENT DOCUMENTS

| 3,487,530 | A * | 1/1970 | Ely | B23K 20/00 228/119 |
| 6,199,746 | B1 * | 3/2001 | Dupree | B23P 6/005 228/119 |

(Continued)

FOREIGN PATENT DOCUMENTS

| CN | 113090336 A | 7/2021 |
| EP | 1867423 A1 | 12/2007 |

(Continued)

OTHER PUBLICATIONS

EP Search Report and for corresponding EP Application No. 20216762.3 dated May 28, 2021, 6 pages.

*Primary Examiner* — Devang R Patel
(74) *Attorney, Agent, or Firm* — James Pemrick; Charlotte Wilson; Hoffman Warnick LLC (57) ABSTRACT

A method for repairing a part and the resulting is disclosed. The method includes positioning a plug having an inner braze element coupled thereto into a cavity defined by an internal surface of a component. The cavity has a circular cross-section at the external surface of the component. The plug completely fills the circular cross-section and the inner braze element is within the cavity. A braze paste is positioned at least partially around the plug at the external surface. The component is positioned such that the inner braze element is above the plug. The component is subjected to a thermal cycle to melt the inner braze element around the plug, completely sealing the cavity by forming a metallurgical bond with the plug and the internal surface of the component. During the thermal cycle the braze paste is melted to form a metallurgical bond with the plug and external surface.

14 Claims, 9 Drawing Sheets

(51) Int. Cl.
*C22C 19/05* (2006.01)
*B23K 101/00* (2006.01)
*B23K 103/08* (2006.01)

(52) U.S. Cl.
CPC .......... *C22F 1/10* (2013.01); *B23K 2101/001* (2018.08); *B23K 2103/08* (2018.08)

(56) References Cited

U.S. PATENT DOCUMENTS

| | | | | |
|---|---|---|---|---|
| 6,454,156 | B1* | 9/2002 | Taras, Jr. | B23K 20/16 |
| | | | | 228/119 |
| 8,087,565 | B2* | 1/2012 | Kottilingam | B23K 35/3033 |
| | | | | 228/119 |
| 8,356,409 | B2* | 1/2013 | Perret | B23K 20/023 |
| | | | | 29/889.1 |
| 8,572,949 | B2* | 11/2013 | Wirth | F01N 3/2066 |
| | | | | 60/286 |
| 9,056,443 | B2* | 6/2015 | Schick | B23K 35/0238 |
| 9,765,623 | B2* | 9/2017 | Kottilingam | B23P 6/005 |
| 9,863,249 | B2 | 1/2018 | Shinn et al. | |
| 2003/0034379 | A1* | 2/2003 | Jackson | B23P 6/005 |
| | | | | 228/119 |
| 2008/0166233 | A1* | 7/2008 | Johnson | F01D 9/023 |
| | | | | 415/230 |
| 2013/0086785 | A1* | 4/2013 | Cui | C22C 19/05 |
| | | | | 29/402.18 |
| 2016/0281482 | A1 | 9/2016 | Nguyen et al. | |
| 2017/0044903 | A1* | 2/2017 | Kottilingam | B23P 15/04 |
| 2018/0161902 | A1* | 6/2018 | Cui | B23K 1/0018 |

FOREIGN PATENT DOCUMENTS

| | | |
|---|---|---|
| EP | 2492044 A1 | 8/2012 |
| EP | 3305464 A1 | 4/2018 |
| EP | 3848142 A1 | 7/2021 |
| JP | 2021109240 A | 8/2021 |

* cited by examiner

SUPERALLOY PART AND METHOD OF PROCESSING

BACKGROUND OF THE INVENTION

The disclosure relates generally to industrial machine part repair or manufacture, and more particularly, to superalloy parts having circular cross-sectional openings on an external surface.

Hard-to-weld (HTW) alloys, such as nickel-based superalloys and certain aluminum-titanium alloys, due to their gamma prime and various geometric constraints, are difficult to join when the gamma prime phase is present in volume fractions greater than about 30%, which may occur when aluminum or titanium content exceeds about 3%. As used herein, an "HTW alloy" is an alloy which exhibits liquation, hot and strain-age cracking, and which is therefore impractical to weld.

Non-weldable (NW) alloys are typically precipitation hardenable or solid-solution strengthened alloys which cannot be practically welded in an industrial setting and at an industrial scale, are only weldable under prohibitively extreme conditions, and, as such, are generally regarded as not being weldable. As used herein, an "NW alloy" refers to alloys having titanium-aluminum equivalents (or combined percentages of composition, by weight) of about 4.5 or higher. NW alloys may include nickel-based alloys in which the primary hardening mechanism is via the process of precipitation, cobalt alloys which are solid solution strengthened, and alloys which require heating immediately prior to and during welding to at least about 1,000 degrees Celsius (° C.).

These HTW and NW alloys may be incorporated into components of gas turbine engines such as airfoils, blades (buckets), nozzles (vanes), shrouds, combustion parts, transitions pieces and other hot gas path (HGP) components. Incorporation of HTW and NW alloys may be desirable due to their often superior operational properties, particularly for certain components subjected to the most extreme conditions and stresses. However, the poor weldability inherent in HTW and NW alloys complicates servicing and repairing components incorporating these alloys.

Industrial machine parts such as airfoils, blades (buckets), nozzles (vanes), shrouds, combustion parts, transitions pieces, and other hot gas path components may have hundreds or thousands of cooling holes that provide fluid flow paths. HGP components in turbomachinery such as turbine blades and nozzles, are exposed to extreme stresses and environment. Occasionally, the machine part can have too many cooling holes, or the cooling holes are in the wrong location or the cooling holes are oversized. These machine parts need to be serviced to eliminate the improperly machined holes. Advances in turbomachinery technology, however, have led to the use of more advanced materials such as superalloys like high gamma prime superalloys, which cannot be repaired using conventional techniques.

Repairs of improperly machined holes in components typically involve positioning a plug with the proper diameter to fit the hole. The process presents a number of challenges. First, the plug must match the diameter of the improperly machined hole. Thus, the plug must be machined after measurement of the diameter of the improperly machined hole to match the size of the hole. Further, there must be a gap between the component and plug to ensure proper brazing. In addition, if the plug is inserted vertically, the plug may drop out. Alternatively, if the plug is inserted horizontally, there is no gap between the plug and the component. There is no guarantee the one braze cycle can fix the improperly machined hole. The plug may move during the brazing process and rework may be required due to voids, lack of braze, over flow, etc. This situation creates an unacceptably long repair cycle.

BRIEF DESCRIPTION OF THE INVENTION

A first aspect of the disclosure provides a method including positioning a plug having an inner braze element coupled thereto into a cavity defined by an internal surface of a component. The cavity has a circular cross-section at the external surface of the component. The plug completely fills the circular cross-section and the inner braze element is within the cavity. The method includes positioning a braze paste at least partially around the plug at the external surface. The method includes positioning the component such that the inner braze element is above the plug. The component is subjected to a thermal cycle to melt the inner braze element around the plug, completely sealing the cavity by forming a metallurgical bond with the plug and the internal surface of the component.

A second aspect of the disclosure provides a component including a body including a first material, wherein the body includes an external surface. The component includes a second material on the external surface completely covering a circular cross-section on the external surface. The component includes a braze material bonded with the first material and the second material on an internal surface defining a cavity within the body.

A third aspect of the disclosure provides a method including positioning a plug having a pre-sintered preform (PSP) coupled thereto into a cavity defined by an internal surface of a superalloy component. The cavity has a circular cross-section at the external surface of the superalloy component. The plug completely fills the circular cross-section and the PSP is within the cavity. The method includes positioning a braze paste at least partially around the plug at the external surface of the superalloy component. The method includes positioning the superalloy component such that the PSP above the plug. The superalloy component is subjected to a thermal cycle to melt the PSP around the plug, completely sealing the cavity by forming a metallurgical bond with the plug and the internal surface of the superalloy component.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

Figure 1:
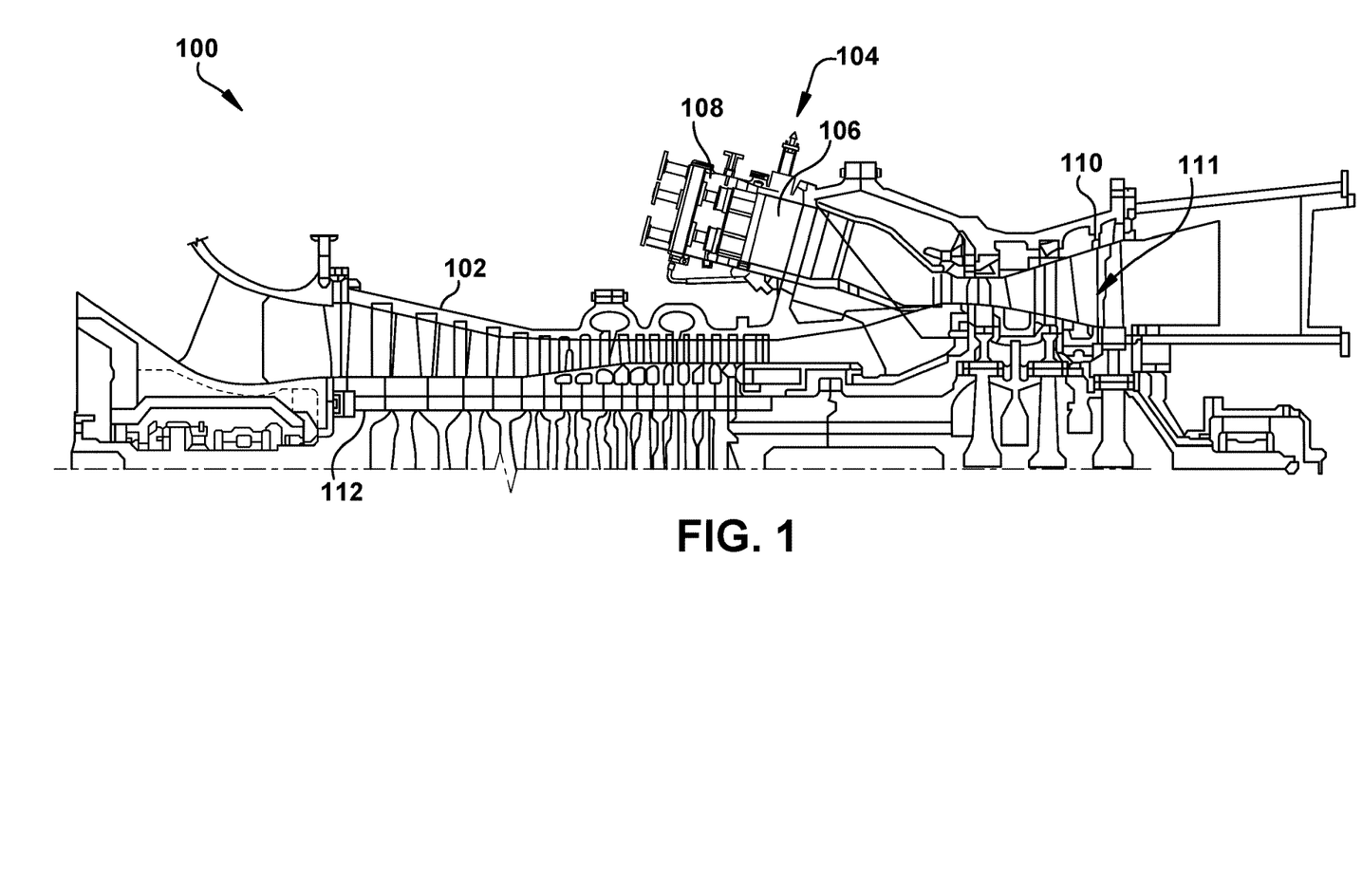
FIG. 1 shows a cross-sectional view of an illustrative industrial machine in the form of a turbomachine.

FIG. 1 shows a schematic illustration of an illustrative industrial machine, a part of which may be repaired according to teachings of the disclosure. In the example, the machine includes a turbomachine 100 in the form of a combustion or gas turbine system. Turbomachine 100 includes a compressor 102 and a combustor 104. Combustor 104 includes a combustion region 106 and a fuel nozzle assembly 108. Turbomachine 100 also includes a turbine 110 and a common compressor/turbine shaft 112 (sometimes referred to as a rotor 112). The present disclosure is not limited to any one particular industrial machine, nor is it limited to any particular combustion turbine system and may be applied in connection with a wide variety of other industrial machines. Furthermore, the present disclosure is not limited to any particular turbomachine, and may be applicable to, for example, steam turbines, jet engines, compressors, turbofans, etc.

In operation, air flows through compressor 102 and compressed air is supplied to combustor 104. Specifically, the compressed air is supplied to fuel nozzle assembly 108 that is integral to combustor 104. Fuel nozzle assembly 108 is in flow communication with combustion region 106. Fuel nozzle assembly 108 is also in fluid communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there are a plurality of combustors 106 and fuel nozzle assemblies 108.

Figure 2:
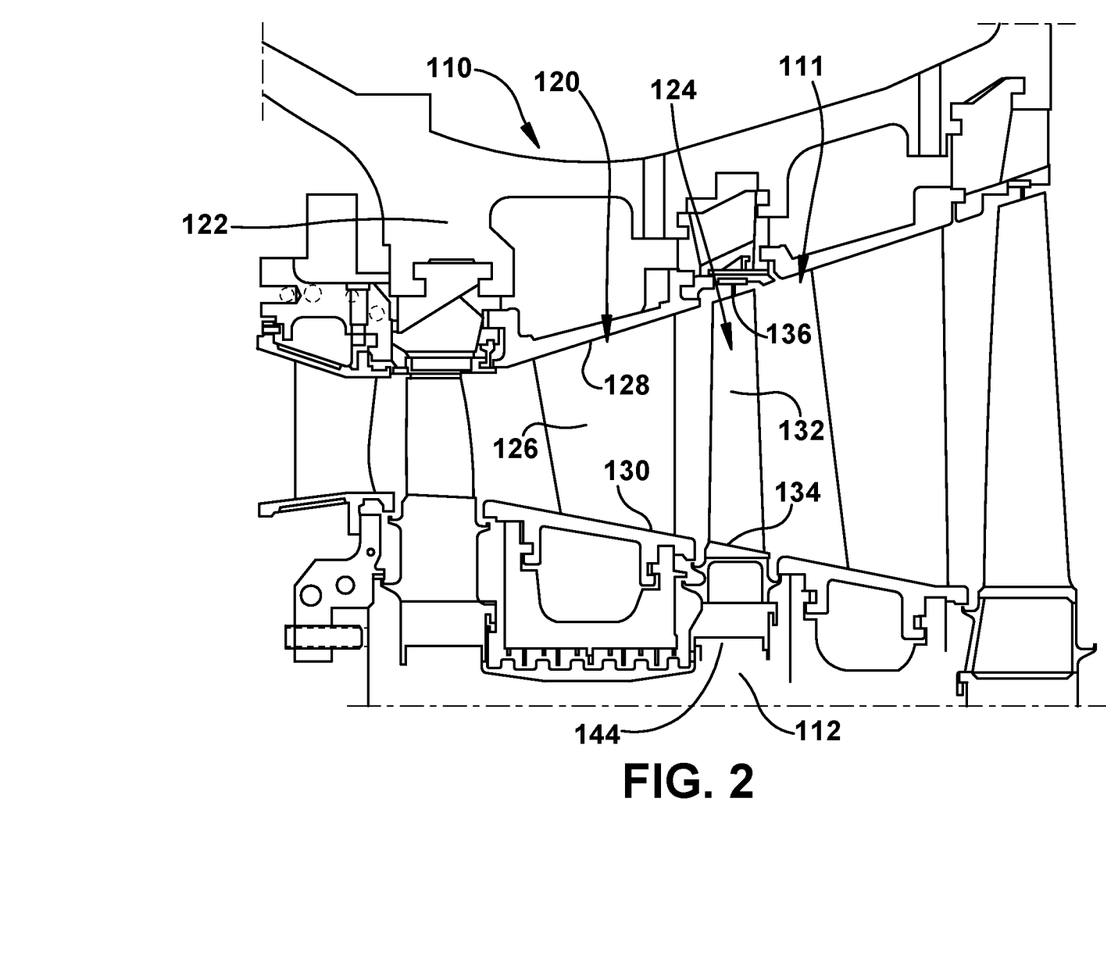
FIG. 2 shows an enlarged cross-sectional area of the turbomachine of FIG. 1.

FIG. 2 shows an enlarged cross-sectional view of an illustrative turbine assembly 110 of turbomachine 100 (FIG. 1) that may be used with the gas turbine system in FIG. 1. Turbine 111 of turbine assembly 110 includes a row of nozzle or vanes 120 coupled to a stationary casing 122 of turbomachine 100 and axially adjacent a row of rotating blades 124. A nozzle or vane 126 may be held in turbine assembly 110 by a radially outer platform 128 and a radially inner platform 130. Row of blades 124 in turbine assembly 110 includes rotating blades 132 coupled to rotor 112 and rotating with the rotor. Rotating blades 132 may include a radially inward platform 134 (at root of blade) coupled to rotor 112 and a radially outward tip shroud 136 (at tip of blade). As used herein, the term "blade" or "hot gas path component" shall refer collectively to stationary vanes or blades 126 and rotating blades 132, unless otherwise stated.

Figure 3:
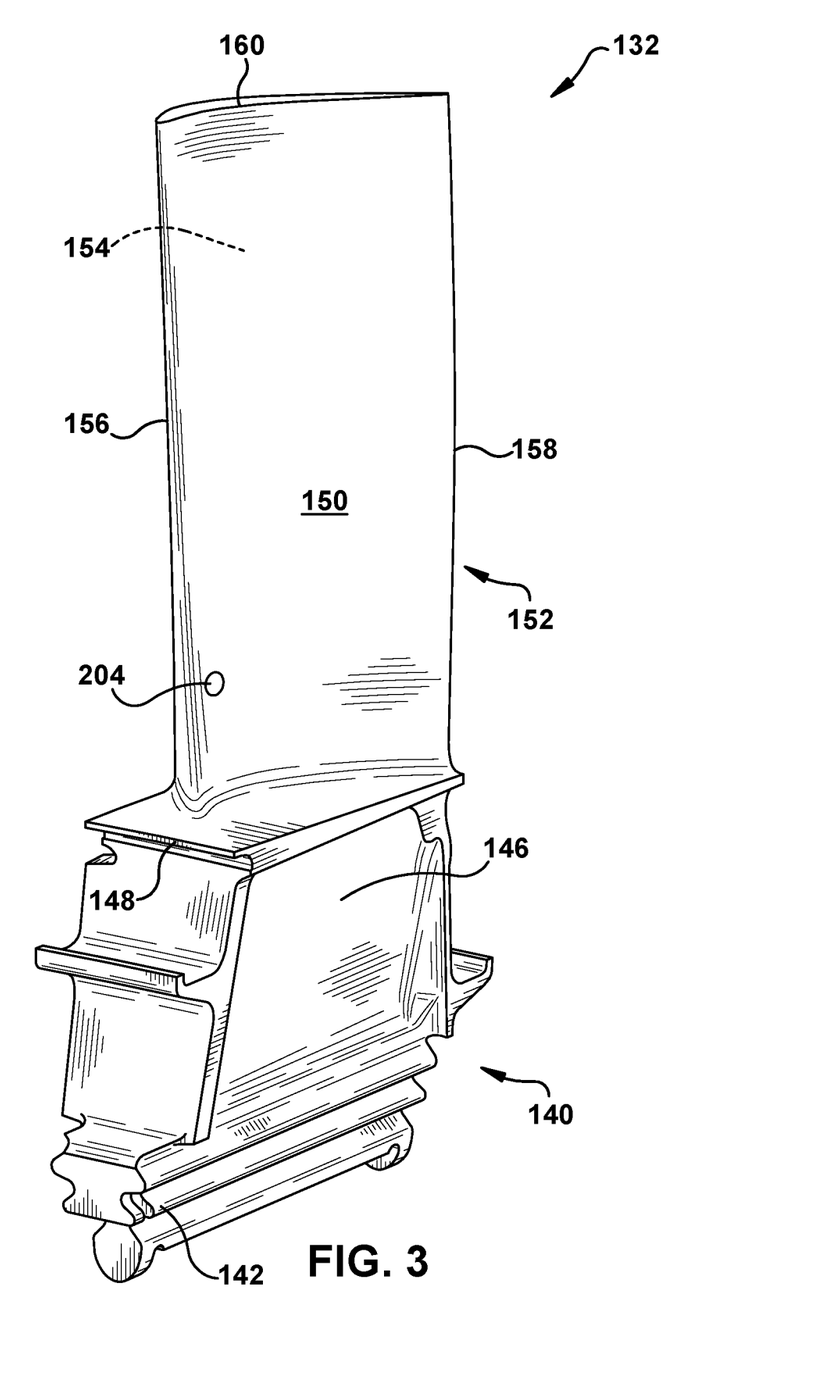
FIGS. 3 and 4 show perspective views of illustrative industrial parts in the form of a turbine blade and turbine nozzle, respectively.
Figure 4:
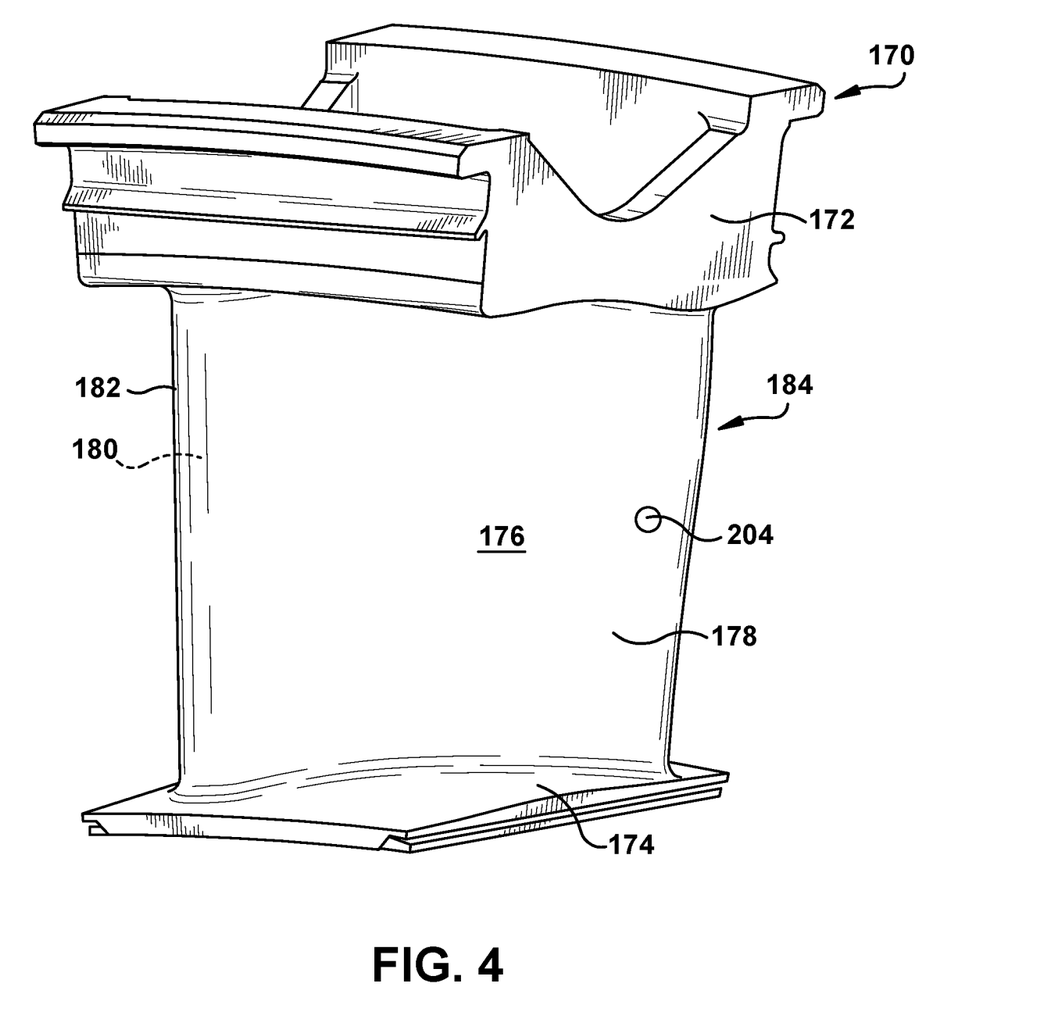

FIGS. 3 and 4 show perspective views of illustrative hot gas path components of a turbomachine in which teachings of the disclosure may be employed. FIG. 3 shows a perspective view of a turbine rotor blade 132 of the type in which embodiments of the present disclosure may be employed. Turbine rotor blade 132 includes a root 140 by which rotor blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of airfoil 150 and root 140 and defines a portion of the inboard boundary of the flow path through turbine assembly 110. It will be appreciated that airfoil 150 is the active component of rotor blade 132 that intercepts the flow of working fluid and induces rotor wheel 144 (FIG. 2) to rotate. It will be seen that airfoil 150 of rotor blade 132 includes a concave pressure side (PS) outer wall 152 and a circumferentially or laterally opposite convex suction side (SS) outer wall 154 extending axially between opposite leading and trailing edges 156, 158 respectively. Sidewalls 156 and 158 also extend in the radial direction from platform 148 to an outboard tip 160.

FIG. 4 shows a perspective view of a stationary vane 170 of the type in which embodiments of the present disclosure may be employed. Stationary vane 170 includes an outer platform 172 by which stationary vane 170 attaches to stationary casing 122 (FIG. 2) of turbomachine 100. Outer platform 172 may include any now known or later developed mounting configuration for mounting in a corresponding mount in the casing. Stationary vane 170 may further include an inner platform 174 for positioning between adjacent turbine rotor blades 132 (FIG. 3) platforms 148 (FIG. 3). Platforms 172, 174 define respective portions of the outboard and inboard boundary of the flow path through turbine assembly 110 (FIG. 2). It will be appreciated that airfoil 176 is the active component of stationary vane 170 that intercepts the flow of working fluid and directs it towards turbine rotor blades 132 (FIG. 3). It will be seen that airfoil 176 of stationary vane 170 includes a concave pressure side (PS) outer sidewall 178 and a circumferentially or laterally opposite convex suction side (SS) outer sidewall 180 extending axially between opposite leading and trailing edges 182, 184 respectively. Sidewalls 178 and 180 also extend in the radial direction from platform 172 to platform 174. Embodiments of the disclosure described herein may be applied to any form of industrial machine part, such as turbine rotor blade 132 and/or stationary vane 170. It is understood that other features of blade 132 or vane 170, not described herein such as but not limited to internal cooling structures, cutout shapes, outer wall angling/shapes, etc., may be customized for the particular application, i.e., rotor blade or vane.

FIGS. 3 and 4 show a cooling hole or cavity 204 that terminates on an external surface of the stationary vane 170 or turbine rotor blade 132 in a circular cross-section. For purposes of description, cavity 204 is considered to be improperly machined, e.g. in the wrong place or the wrong size, and therefore requires filling.

The components shown in FIGS. 1-4 may be of a superalloy material. Superalloys provide a wide variety of superior physical characteristics, but do not lend themselves to conventional repair techniques such as welding. More particularly, with these superalloy materials, conventional welding is insufficient because the weld does not result in a structure that has the same valuable superalloy properties of the part. Further, the welding may lead to additional damage, e.g., cracking.

Embodiments of the disclosure provide a brazing process which overcomes the deficiencies noted above. The method begins with a component having a cavity that needs to be filled. The cavity has a circular cross-section at the external surface of the component. The method includes positioning a plug having an inner brazing element attached thereto. The plug is positioned onto a cavity of a component completely covering the circular cross-section at the external surface. The inner brazing element is within the cavity. A braze paste is applied around the plug at the external surface. The component is positioned with the inner brazing element above the plug and the component is subjected to a thermal cycle to melt the inner brazing element around the plug, completely sealing the cavity by forming a metallurgical bond with the plug and the internal surface of the component. The braze paste forms a metallurgical bond with the plug and the external surface during the thermal cycle. A more detailed description is provided below.

Figure 5:
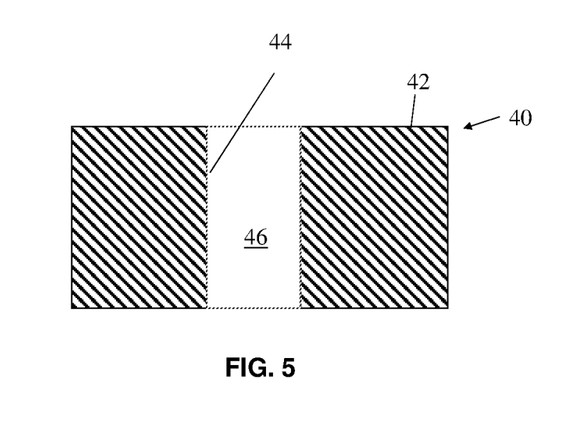
FIG. 5 show a cross-sectional view of a component of a turbomachine.

FIG. 5 shows a cross section of component 40 of a turbomachine. Component 40 includes exterior surface 42, and an inner surface 44 defining cavity 46. Component 40 may be, for example, a turbine blade, turbine shroud, nozzle, or combustion part having a cavity that needs to be filled. Cavity 46 may be, for example, a cooling passage. Component 40 may be made of a superalloy material.

As used herein, "superalloy" refers to an alloy having numerous excellent physical characteristics compared to conventional alloys, such as but not limited to: high mechanical strength, high thermal creep deformation resistance, high corrosion or oxidation resistance, and good surface stability. Superalloy examples may include but are not limited to: Rene alloys like Rene 108, CM247, Hastelloy, Waspaloy, Haynes alloys, Inconel, Incoloy, MP98T, TMS alloys, CMSX single crystal alloys. In an embodiment, superalloys for which teachings of the disclosure may be especially advantageous are those superalloys having a high gamma prime ($\gamma'$) value. "Gamma prime" ($\gamma'$) is the primary strengthening phase in nickel-based alloys. Examples of high gamma prime superalloys include but are not limited to: Rene 108, N5, GTD 444, MarM 247 and IN 738.

Figure 6:
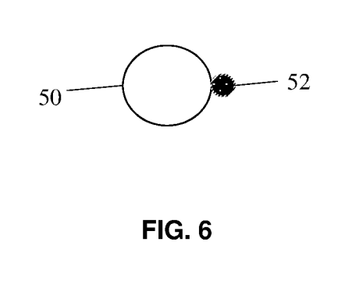
FIGS. 6-11 show a side view of various plug having an inner braze element attached thereto.
Figure 7:
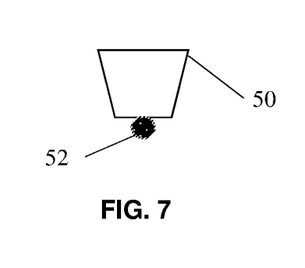
Figure 8:
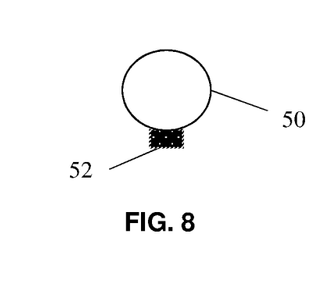
Figure 9:
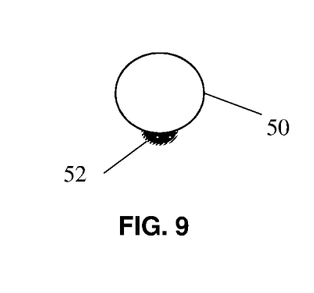
Figure 10:
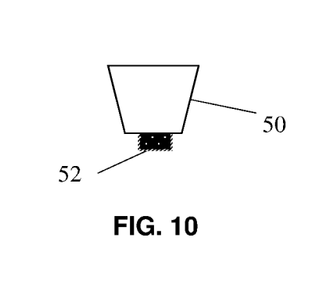
Figure 11:
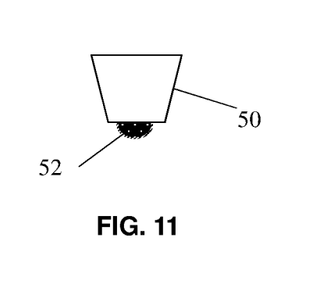

FIGS. 6-11 show various configurations of plug 50 which has an inner braze element 52 attached thereto. The inner braze element 52 may be tack welded to the plug 50 or otherwise attached to plug 50. Plug 50 may be a sphere, as shown in FIGS. 6, 8 and 9. FIGS. 7, 10 and 11 show plug 50 as a cylinder where the sides are tapered. Plug 50 may be a superalloy as described above. Plug 50 may be the same material as component 40 (FIG. 5) being repaired. Alternatively, plug 50 may be a different material than the component 40 (FIG. 5) being repaired.

In embodiments, the inner braze element 52 may be a braze ball (FIGS. 6 and 7), braze cylinder or braze sheet or braze plate (FIGS. 8 and 10) or braze paste (FIGS. 9 and 11). The inner braze element 52 may be any shape that can be attached the plug 50 and inserted into cavity 46.

Inner braze element 52 may include braze materials such as nickel-based filler metals. Examples of such braze materials include BNi-2, BNi-5, BNi-9, DF4B, D15 or high melt/low melt mixtures, for example, MarM 247/D15 in a 50/50 ratio.

In embodiments, inner braze element 52 may be a pre-sintered preform (PSP). A PSP may be, but is not limited to, a mixture of a first material having a first melting point and a second material having a second melting point, the first melting point being lower than the second melting point. The mixture is at any suitable ratio for providing desired properties. Suitable ratios for the mixture may include, but are not limited to, between about 40% and about 95% being the first material; between about 50% and about 80% being the first material; between about 5% and about 60% being the second material; between about 20% and about 50% being the second material, about 50% being the first material; about 50% being the second material; about 20% being the second material; about 80% being the first material, or any suitable combination, sub-combination, range, or sub-range therein.

In an embodiment, the first material is considered as a high-melt material and the first melting point is above about 1300° C. In an embodiment, the second material is considered as a low-melt material and the second melting point, for example, between about 870° C. and about 1260° C.

A suitable high-melt material for the PSP has a composition, by weight, of between about 13.7% and about 14.3% chromium (Cr), between about 9% and about 10% cobalt (Co), between about 2.8% and about 3.2% aluminum (Al), between about 4.7% and about 5.1% titanium (Ti), between about 3.5% and about 4.1% tungsten (W), between about 1.4% and about 1.7% molybdenum (Mo), between about 2.4% and about 3.1% tantalum (Ta), up to about 0.12% carbon (C) (for example, between about 0.08% and about 0.12%), up to about 0.04% zirconium (Zr), up to about 0.02% boron (B) (for example, between about 0.005% and about 0.020%), up to about 0.35% iron (Fe) up to about 0.3% Si, up to about 0.1% manganese (Mn), up to about 0.1% copper (Cu), up to about 0.015% phosphorus (P), up to about 0.005% sulfur (S), up to about 0.15% niobium (Nb), and a balance of nickel.

Another suitable high-melt material for the PSP has a composition, by weight, of between about 8.0% and about 8.7% Cr, between about 9% and about 10% Co, between about 5.25% and about 5.75% Al, up to about 0.9% Ti (for example, between about 0.6% and about 0.9%), between about 9.3% and about 9.7% W, up to about 0.6% Mo (for example, between about 0.4% and about 0.6%), between about 2.8% and about 3.3% Ta, between about 1.3% and about 1.7% hafnium (Hf), up to about 0.1% C (for example, between about 0.07% and about 0.1%), up to about 0.02% Zr (for example, between about 0.005% and about 0.02%), up to about 0.02% B (for example, between about 0.01% and about 0.02%), up to about 0.2% Fe, up to about 0.06% silicon (Si), up to about 0.1% Mn, up to about 0.1% Cu, up to about 0.01% P, up to about 0.004% S, up to about 0.1% Nb, and a balance of nickel.

Another suitable high-melt material for the PSP has a composition, by weight, of between about 13.7% and about 14.3% Cr, between about 9% and about 10% Co, between about 2.8% and about 3.2% Al, between about 4.8% and about 5.2% Ti, between about 3.7% and about 4.3% W, between about 3.7% and about 4.3% Mo, up to about 0.1% rhenium (Re) (with Re and W being less than about 4.3%), up to about 0.1% Ta, up to about 0.1% Hf, up to about 0.19% C (for example, between about 0.15% and about 0.19%), up to about 0.15% Pd, up to about 0.3% Pt, up to about 0.01% Mg, up to about 0.1% Zr (for example, between about 0.02% and about 0.1%), up to about 0.02% B (for example, between about 0.01% and about 0.02%), up to about 0.35% Fe, up to about 0.1% Si, up to about 0.1% Mn, up to about 0.015% P, up to about 0.0075% S, up to about 0.1% Nb, and a balance of nickel.

Another suitable high-melt material for the PSP has a composition, by weight, of between about 6.6% and about 7% Cr, between about 11.45% and about 12.05% Co, between about 5.94% and about 6.3% Al, up to about 0.02% Ti, between about 4.7% and about 5.1% W, between about 1.3% and about 1.7% Mo, between about 2.6% and about 3% Re, between about 6.2% and about 6.5% Ta, between about 1.3% and about 1.7% Hf, up to about 0.14% C (for example, between about 0.1% and about 0.14%), up to about 0.3% platinum (Pt), up to about 0.0035% magnesium (Mg), up to about 0.03% Zr, up to about 0.02% B (for example, between about 0.01% and about 0.02%), up to about 0.2% Fe, up to about 0.06% Si, up to about 0.1% Mn, up to about 0.01% P, up to about 0.004% S, up to about 0.1% Nb, and a balance of nickel.

Another suitable high-melt material for the PSP has a composition, by weight, of between about 16.5% and about 18.5% Cr, between about 27% and about 30% Mo, about 1.5% Ni, up to about 0.08% C, about 1.5% Fe, between about 3% and about 3.8% Si, up to about 0.03% P, up to about 0.03% S, up to about 0.15% oxygen (O), and a balance of cobalt.

A suitable low-melt material for the PSP has a composition, by weight, of between about 22.5% and about 24.25% Cr, up to about 0.3% Ti (for example, between about 0.15% and about 0.3%), between about 6.5% and about 7.5% W, between about 9% and about 11% nickel (Ni), between about 3% and about 4% Ta, up to about 0.65% C (for example, between about 0.55% and about 0.65%), between about 2% and about 3% B, about 1.3% Fe, up to about 0.4% Si, up to about 0.1% Mn, up to about 0.02% S, and a balance of cobalt.

Another suitable low-melt material for the PSP has a composition, by weight, of about 14% Cr, about 10% Co, about 3.5% Al, about 2.75% B, between about 2.5% and about 2.75% Ta, up to about 0.1% yttrium (Y), and a balance of nickel.

Another suitable low-melt material for the PSP has a composition, by weight, of about 14% Cr, about 9% Co, about 4% Al, about 2.5% B, and a balance of nickel.

Another suitable low-melt material for the PSP has a composition, by weight, of about 15.3% Cr, about 10.3% Co, about 3.5% Ta, about 3.5% Al, about 2.3% B, and a balance of nickel.

Another suitable low-melt material for the PSP has a composition, by weight, of about 15.3% Cr, about 10.3% Co, about 3.5% Ta, about 3.5% Al, about 2.3% B, and a balance of nickel.

Figure 12:
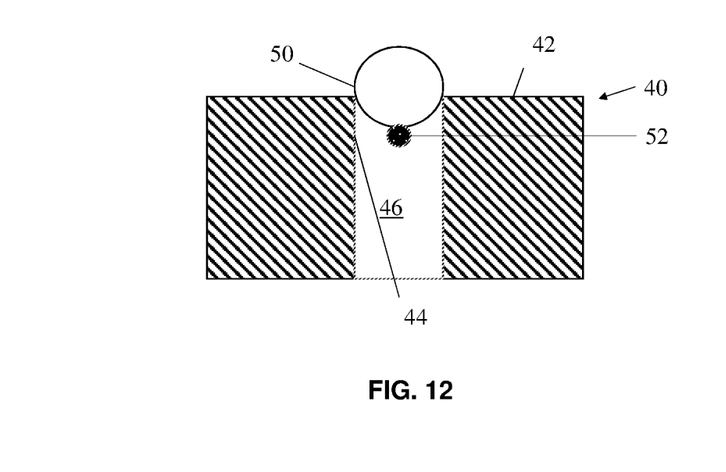
FIG. 12 shows a cross-sectional view of positioning a plug with an inner braze element attached thereto on a component of a turbomachine having a cavity.

In FIG. 12, plug 50 with inner braze element 52 is positioned such that the inner braze element is in within cavity 46. That is, inner braze element 52 is entirely within cavity 46. Plug 50 is a sphere in this embodiment and completely covers the circular cross-section of the cavity at external surface 42. Plug 50 may be tacked, interference fit, or otherwise affixed to component 40.

Figure 13:
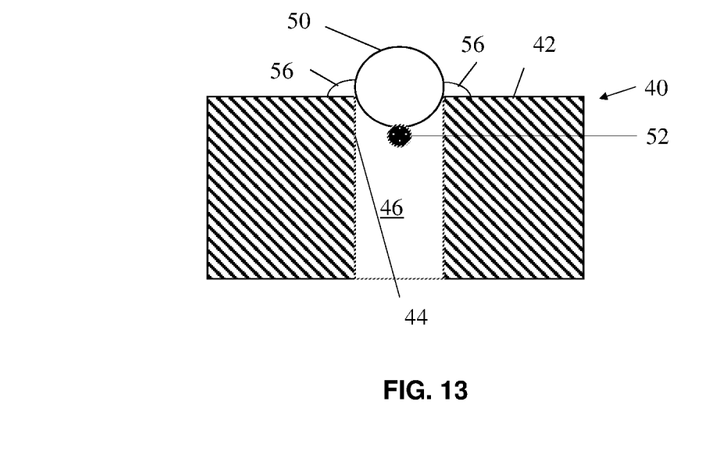
FIG. 13 shows a cross-sectional view of positioning a braze paste around plug on a component of a turbomachine having a cavity.

Braze paste 56 may be applied on exterior surface 42 of component 40 as shown in FIG. 13. Braze paste 56 may include a single component mixture, where silicon Si is added as a melt point depressant. In embodiments, the composition of the braze paste 56 containing exclusively silicon (Si) as a melt point depressant are: (a) Ni-19Cr-10Si (typically referred to as B50TF81); (b) Ni-15Cr-8Si (typically referred to as B50TF143); (c) Ni-17Cr-9.2Si-0.1B (typically referred to by GE as B50TF142); and (d) Ni-19Cr-9.5Si-9.5 Mn (typically referred to as B50TF99).

In an embodiment, braze paste 56 contains metals containing either boron (B) or silicon (Si) (or a combination of both). In embodiments, braze past 56 may contain superalloy powder as a filler.

Figure 14:
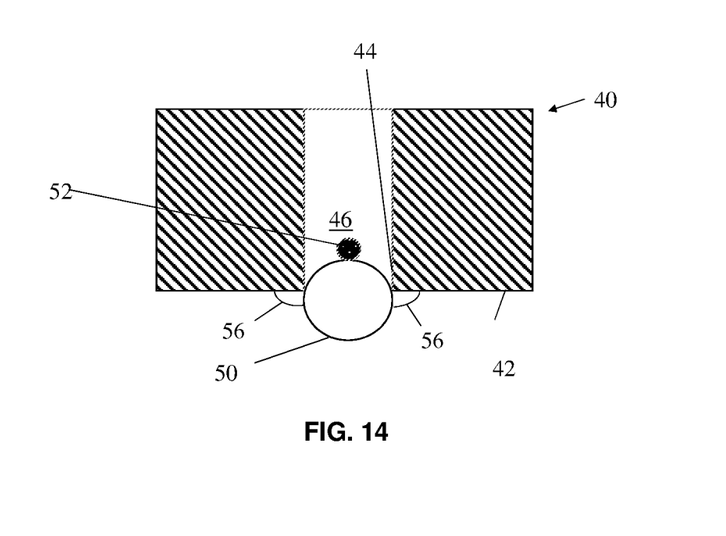
FIG. 14 shows a cross-sectional view of positioning a component such that the inner braze element is above the plug.

As shown in FIG. 14, component 40 is then positioned so that inner braze element 52 is above plug 50.

Figure 15:
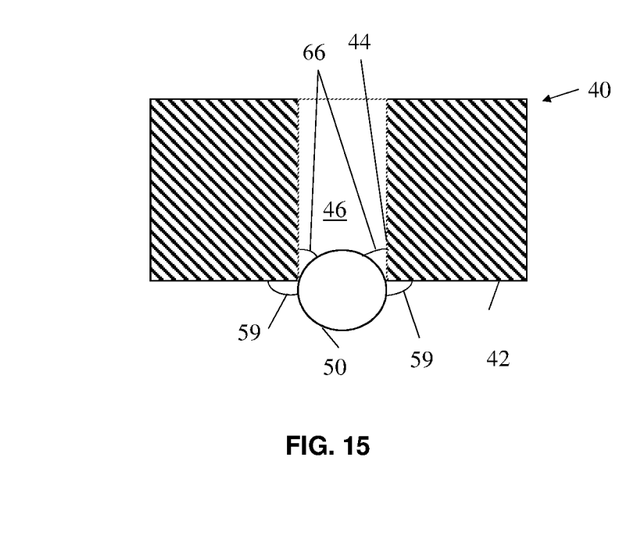
FIG. 15 shows a cross-sectional view of a component after performing a thermal cycle to melt the inner braze element.

FIG. 15 shows component 40 being subjected to a thermal cycle to melt inner braze element 52 and form a metallurgical bond 66 with inner surface 44 of component and plug 50. A metallurgical bond 59 is formed with the outer surface 42 and plug 50 after the thermal cycle.

The brazing process or thermal cycle occurs at the braze temperature, which is based upon the materials of inner braze element 52 melting and/or fusing to interior surface 44 and the plug 50. In embodiments, with inner braze element 52 being a nickel-based braze alloy, the brazing application temperature is between about 871° C. and 1260° C.

Figure 16:
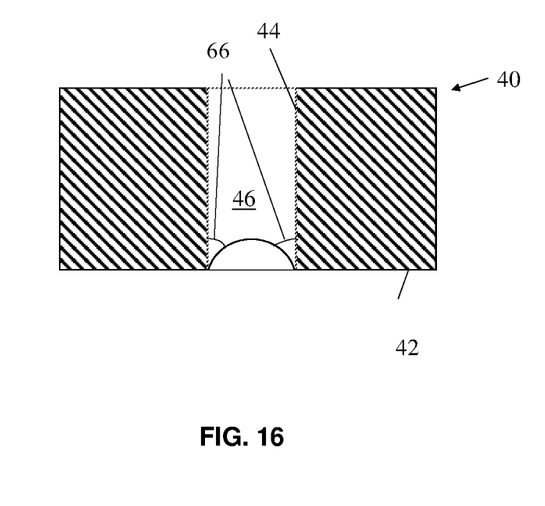
FIG. 16 shows a cross-sectional view of a component after a finishing operation.

As shown in FIG. 16, in embodiments the component may be treated to any variety of now known or later developed finishing steps, e.g., grinding, polishing, etc. to form a smooth exterior surface 42.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
    providing a spherical plug having an inner braze element tacked onto an outer surface of the spherical plug;
    positioning the spherical plug having the inner braze element into a cavity defined an internal surface of a component, wherein the cavity has a circular cross-section at an external surface of the component, wherein the spherical plug fills the circular cross-section, wherein the spherical plug has a circular cross-section and a portion of the spherical plug has a circular cross-section larger than the circular cross-section of the cavity;
    positioning a braze paste at least partially around the spherical plug at the external surface;
    positioning the spherical plug in the cavity wherein the inner braze element is positioned within the cavity;
    positioning the component such that the inner braze element is above the spherical plug;
    subjecting the component to a thermal cycle to melt the inner braze element;
    flowing the inner braze element around the spherical plug; and
    sealing the cavity by forming a metallurgical bond between the inner braze element and the internal surface of the component, wherein the metallurgical bond is formed with the internal surface of the component and spherical plug after the thermal cycle.

2. The method of claim 1, further comprising grinding the component to smooth the external surface.

3. The method of claim 1, wherein the inner braze element comprises a mixture of a powdered low-melt braze material, a powdered high-melt material, and a binder.

4. The method of claim 1, wherein the braze paste comprises a braze filler material and a nickel based metal filler brazing powder.

5. The method of claim 1, wherein the component is selected from the group consisting of: a gas turbine nozzle, a turbine bucket, a shroud, and a combustion part.

6. The method of claim 1, wherein the component comprises one of a single crystal superalloy, an equiaxed superalloy, or a directionally solidified (DS) superalloy.

7. The method of claim 1, wherein a metallurgical bond is formed with the spherical plug and the external surface of the component.

8. The method of claim 1, wherein the spherical plug comprises one of a single crystal superalloy, an equiaxed superalloy, or a directionally solidified (DS) superalloy.

9. The method of claim 1, wherein the cavity is fluidly coupled to a fluid path in the component.

10. A method comprising:
    providing a spherical plug having an inner braze spherical pre-sintered preform (PSP) tacked onto an outer surface of the spherical plug;
    positioning the spherical plug having the inner braze spherical pre-sintered preform into a cavity defined an internal surface of a superalloy component, wherein the cavity has a circular cross-section at an external surface of the superalloy component, wherein the inner braze spherical plug completely fills the circular cross-section, wherein the inner braze spherical PSP has a circular cross-section and a portion of the spherical plug has a circular cross-section larger than the circular cross-section of the cavity, wherein a portion of the spherical plug is positioned within the cavity;
    positioning a braze paste at least partially around the spherical plug at the external surface of the superalloy component;
    positioning the superalloy component such that the inner braze spherical PSP is above the spherical plug; and
    subjecting the superalloy component to a thermal cycle to flow the inner braze spherical PSP around the spherical plug,
    sealing the cavity completely by forming a metallurgical bond between the inner braze spherical PSP and the internal surface of the superalloy component, wherein the metallurgical bond is formed with the internal surface of the superalloy component and spherical plug after the subjecting to the thermal cycle.

11. The method of claim 10, further comprising grinding the superalloy component to smooth the external surface.

12. The method of claim 10, wherein the superalloy component is selected from the group consisting of: a gas turbine nozzle, a turbine bucket, a shroud and a combustion part.

13. The method of claim 10, wherein the inner braze spherical PSP comprises a first material having a first melting point and a second material having a second melting point, the first melting point being lower than the second melting point.

14. The method of claim 10, wherein the cavity is fluidly coupled to a fluid path in the superalloy component.

* * * * *